(12) United States Patent
Edwards, Jr. et al.

(10) Patent No.: US 7,730,122 B2
(45) Date of Patent: Jun. 1, 2010

(54) AUTHENTICATING A NODE REQUESTING ANOTHER NODE TO PERFORM WORK ON BEHALF OF YET ANOTHER NODE

(75) Inventors: Robert Clair Edwards, Jr., Susquehanna, PA (US); Glen Hattrup, Tucson, AZ (US); Avishai Haim Hochberg, San Jose, CA (US); Neil Gregory Rasmussen, Livermore, CA (US); James Patrick Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 1550 days.

(21) Appl. No.: 11/009,774

(22) Filed: Dec. 9, 2004

(65) Prior Publication Data

US 2006/0129685 A1   Jun. 15, 2006

(51) Int. Cl.
*G06F 15/16* (2006.01)

(52) U.S. Cl. .............. 709/203; 709/201; 709/226; 709/227; 709/228; 713/163; 713/171

(58) Field of Classification Search .............. 709/201, 709/203, 226, 227, 228; 713/163, 171
See application file for complete search history.

(56) References Cited

U.S. PATENT DOCUMENTS

| | | | |
|---|---|---|---|
| 4,995,112 A | 2/1991 | Aoyama | |
| 5,553,239 A | 9/1996 | Heath et al. | |
| 6,256,740 B1 | 7/2001 | Muller et al. | |
| 6,345,287 B1 | 2/2002 | Fong et al. | |
| 6,389,543 B1 | 5/2002 | Dawson et al. | |
| 6,751,729 B1 | 6/2004 | Giniger et al. | |
| 2001/0044879 A1 | 11/2001 | Moulton et al. | |
| 2002/0107877 A1 | 8/2002 | Whiting et al. | |
| 2002/0124090 A1* | 9/2002 | Poier et al. | 709/228 |
| 2003/0126200 A1 | 7/2003 | Wolff | |

(Continued)

OTHER PUBLICATIONS

U.S. Appl. No. 11/010,078, filed Dec. 9, 2004, entitled "Performing Scheduled Backups of a Backup Node Associated with a Plurality of Agent Nodes", invented by Derk, D.D., R.C. Edwards, Jr., G. Hattrup, A.H. Hochberg, T.F. Ramke, Jr., and J.P. Smith.

*Primary Examiner*—Jinsong Hu
(74) *Attorney, Agent, or Firm*—David W. Victor; Konrad Raynes and Victor LLP

(57) ABSTRACT

Provided are a method, system, and program for authenticating a node requesting another node to perform work on behalf of yet another node. A plurality of agent nodes in the network are associated with a multi-node, wherein the agent nodes are associated with machines in the network capable of performing operations on behalf of the multi-node. A target node receives a request from a calling node for the target node to perform operations on behalf of the multi-node, wherein the target node is one of the agent nodes associated with the multi-node. The target node determines whether the calling node is one of the agent nodes associated with the multi-node and determines whether the calling node is capable of authenticating with a server. The target node performs the operations requested by the calling node in response to determining that the calling node is associated with the multi-node and is capable of authenticating with the server.

42 Claims, 4 Drawing Sheets

U.S. PATENT DOCUMENTS

| | | |
|---|---|---|
| 2003/0135621 A1 | 7/2003 | Romagnoli |
| 2003/0154238 A1* | 8/2003 | Murphy et al. .............. 709/201 |
| 2003/0177149 A1 | 9/2003 | Coombs |
| 2004/0019624 A1 | 1/2004 | Sukegawa |
| 2004/0039816 A1 | 2/2004 | Bae et al. |
| 2005/0097317 A1* | 5/2005 | Trostle et al. ............... 713/163 |
| 2005/0198117 A1* | 9/2005 | Dias et al. ................... 709/203 |
| 2005/0223229 A1* | 10/2005 | Roeder et al. ............... 713/171 |

* cited by examiner

AUTHENTICATING A NODE REQUESTING ANOTHER NODE TO PERFORM WORK ON BEHALF OF YET ANOTHER NODE

BACKGROUND OF THE INVENTION

1. Field of the Invention

The present invention relates to a method, system, and program for authenticating a node requesting another node to perform work on behalf of yet another node.

2. Description of the Related Art

In a network backup environment, a client system may backup data in a storage device and coordinate the backup with a backup server. For instance, the International Business Machines ("IBM"®) Tivoli® Storage Manager product provides software for a client and server systems to backup client data. (IBM and Tivoli are registered trademarks of IBM).

In a backup environment of multiple client nodes, one client node may logon to the backup server to perform backup operations on behalf of another node having data sets to backup, which may be part of a scheduled backup. To schedule a backup operation, a backup operation may be scheduled for one node to backup data sets in an attached storage at that node or a set of backup operations may be defined and associated with nodes to perform the scheduled backup. In the second technique, a schedule is defined and nodes are associated with that schedule.

In one system, an administrator user at a Web browser may contact nodes one at a time and authenticate with the server through these nodes to have the nodes perform backup related tasks. This process is called passthrough authentication and requires that the administrator at the Web browser have authority over these nodes in order to authenticate through them to the server. The administrator at the Web browser enters their credentials at the web browser, which are then submitted to the server through the node.

SUMMARY

Provided are a method, system, and program for authenticating a node requesting another node to perform work on behalf of yet another node. A plurality of agent nodes in the network are associated with a multi-node, wherein the agent nodes are associated with machines in the network capable of performing operations on behalf of the multi-node. A target node receives a request from a calling node for the target node to perform operations on behalf of the multi-node, wherein the target node is one of the agent nodes associated with the multi-node. The target node determines whether the calling node is one of the agent nodes associated with the multi-node and determines whether the calling node is capable of authenticating with a server. The target node performs the operations requested by the calling node in response to determining that the calling node is associated with the multi-node and is capable of authenticating with the server.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
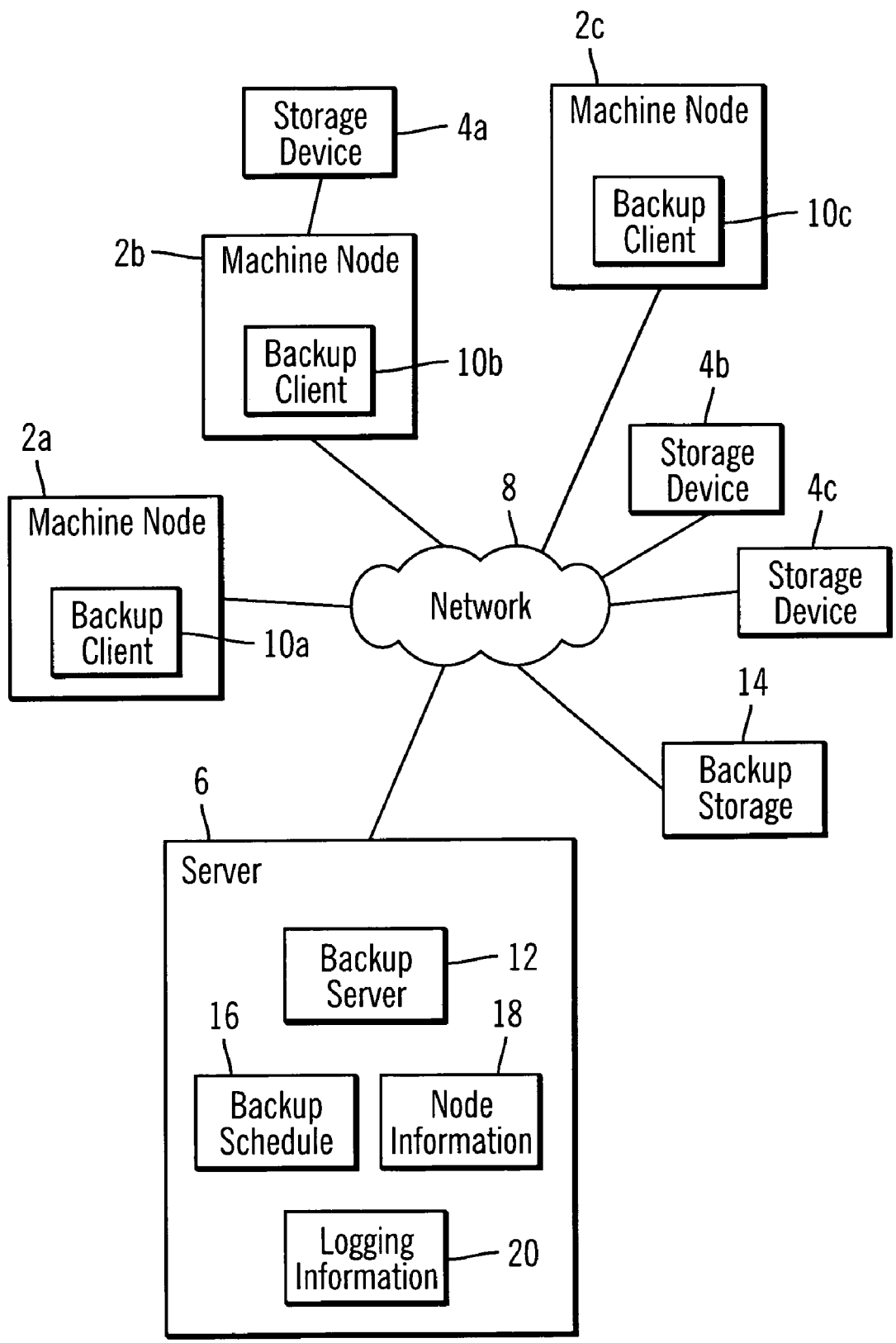
FIG. 1 illustrates an embodiment of a network computing environment.

FIG. 1 illustrates a network computing environment having a plurality of machine nodes 2a, 2b, and 2c (three are shown, but there may be more), a plurality of storage devices 4a, 4b, 4c (three are shown, but there may be more), and a server 6 that communicate over a network 8. The machine nodes 2a, 2b, 2c include a backup client 10a, 10b, 10c program and the server 6 includes a backup server 12 program to coordinate machine node 2a, 2b, 2c operations to backup data sets in the storage devices 4a, 4b, 4c to backup storage 14. The storage devices, e.g., 4a, may be coupled to machine nodes, 2b, and connect to the network 8 via the connected machine node 2b. The backup server 12 maintains a backup schedule 16 of backup operations to perform, node information 18 providing information on the network nodes involved in backup operations, and logging information 20 that the backup server 12 logs for backup operations.

To backup data, the machine nodes 2a, 2b, 2c may backup data from attached storage devices to the server 6, which then backups the data sets in backup storage 14. Alternatively, in a LAN free backup operation, the machine nodes 2a, 2b, 2c coordinate backup operations with the server 6 via a separate network, such as a Local Area Network (LAN) (not shown), and then the machine nodes 2a, 2b, 2c directly backup data from the storage devices 4a, 4b, 4c over the network 8, which may comprise a Storage Area Network (SAN), to the backup storage 14. The backup storage 14 may be attached directly to the network 8, such as shown in FIG. 1, or be coupled to the server 6 or some other machine and connect to the network 8 through the server 6.

The machine nodes 2a, 2b, 2c may comprise suitable computational devices known in the art, such as servers, desktop computers, workstations, mainframes, hand held computing devices, telephony devices, etc. capable of interfacing with a backup server 6. The storage devices 4a, 4b, 4c may comprise any suitable storage device known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a tape library, an optical library, a network attached storage (NAS), etc. Alternatively, the storage devices may comprise local storage, e.g., 4a, within or attached to a machine node, e.g., 2b. The storage devices 4a, 4b, 4c comprise network nodes having storage. The storage device nodes 4a, 4b, 4c may include a backup client program (not shown) to coordinate with the backup server 12 to transfer their data sets to the backup storage 14. The server 6 may comprise a suitable server system known in the art to manage backup messages from multiple systems. The backup storage 14 may comprise suitable non-volatile storage systems known in the art, such as tape storage, hard disk drives, optical storage, etc. The network 6 may comprise one or more networks known in the art, such as a Wide Area Network (WAN), Local Area Network (LAN), Storage Area Network (SAN), wireless network, the Internet, and Intranet, etc.

Figure 2:
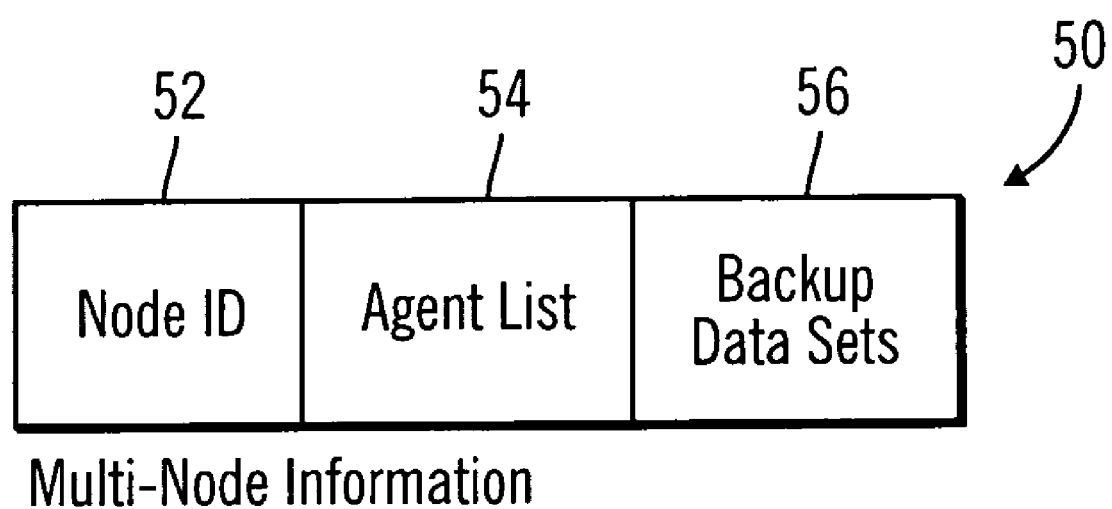
FIG. 2 illustrates an embodiment of multi-node information.

FIG. 2 illustrates an embodiment of the node information 50 for a multi-node node, comprising: a multi-node identifier (ID) 52; an agent list 54 that associates a plurality of agent nodes comprising machine nodes 2a, 2b, 2c in the network 8 with the multi-node node; and backup data sets 56. The identified agent nodes in the agent list 54 are assigned to backup and restore the indicated backup data sets 56. The backup data sets 56 may include data sets in different storage devices 4a, 4b, 4c in the network 8, such that the backup data set 56 information identifies a location in the network 8 and a location in the storage device 4a, 4b, 4c of the data to backup. The agent list 54 may further indicate a status of the agent machine nodes 2a, 2b, 2c such as whether they are available to participate in a backup of the backup data sets 56 for the node.

In one embodiment, a multi-node 50 may comprise a virtual node in that there is no physical machine node 2a, 2b, 2c directly corresponding to the multi-node 50. The machine nodes 2a, 2b, 2c indicated in the agent list 54 comprise the computational resources that correspond to the multi-node 50 and that are designated to perform work on behalf of the multi-node, such as backup the backup sets 56 defined for the multi-node 50. Further, the data sets for a virtual multi-node may be distributed across multiple physical storage devices 4a, 4b, 4c. A virtual multi-node 50 may be used to group data sets in distributed storage 4a, 4b, 4c that have common characteristics, such as a common backup policy, common source, common importance, etc. Alternatively, the multi-node 50 may comprise a machine node, e.g., 2b having attached storage, e.g., 4b, and the agent nodes indicated in the agent list 54 comprise additional machine nodes 2a on the network 8 that are assigned to backup the backup data sets 56 of the multi-node 50. In either case, when an agent node performs operations on behalf of the multi-node, which may comprise a virtual or physical machine node, the agent node may masquerade as, i.e., operation on behalf of, the multi-node so that the backup operations the agent node performs on behalf of the multi-node are logged by the backup server 12 as performed by the multi-node in the log information 20.

In one embodiment, the multi-node comprises a backup node that associates machines and backup data sets to backup. In alternative embodiments, the multi-node may represent a group of agent machines and work performed, where the work performed may be other than backup and restore work.

Figure 3:
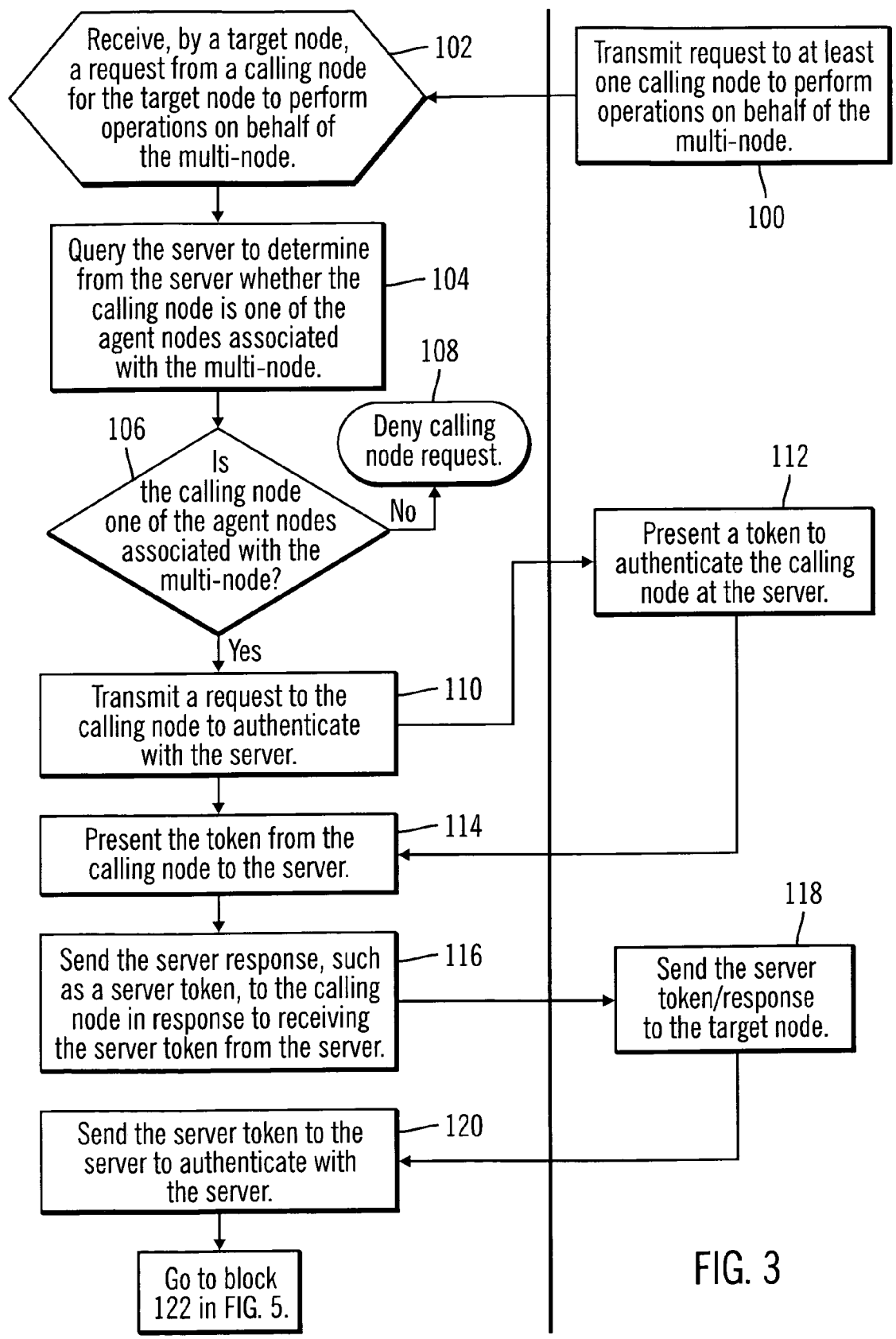
FIGS. 3 and 4 illustrate an embodiment of operations to authenticate one node requesting another node to perform work.
Figure 4:
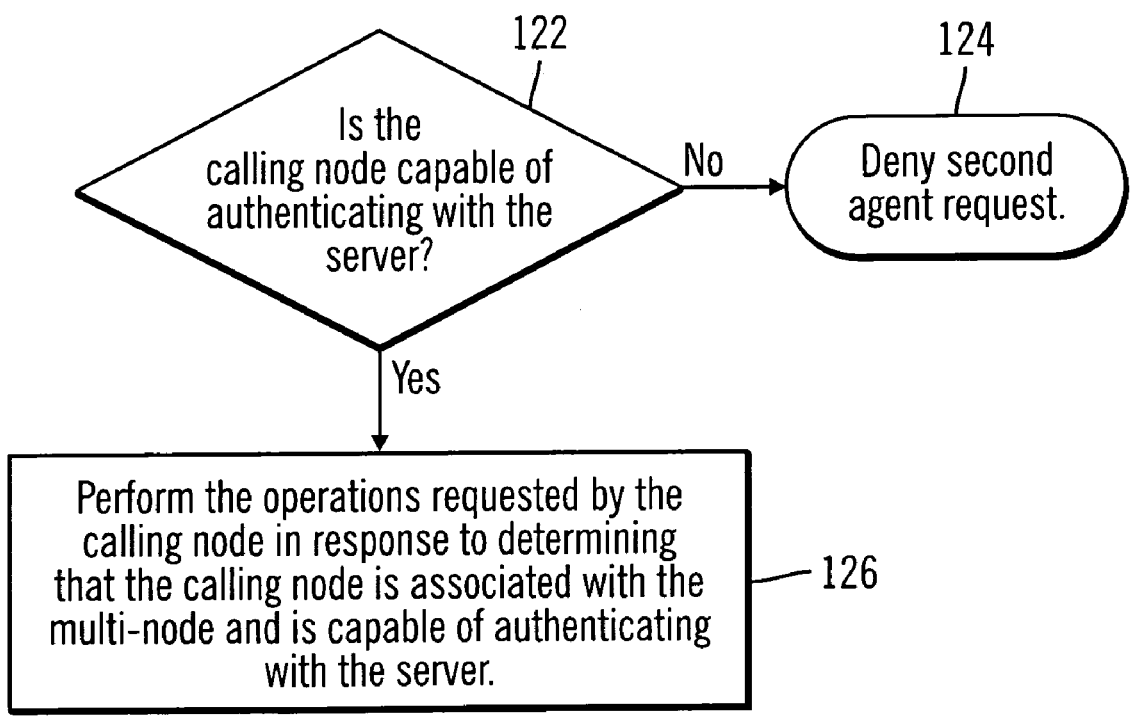

FIGS. 3 and 4 illustrate an embodiment of operations implemented in the backup client programs 10a, 10b, 10c of the machine nodes 2a, 2b, 2c. In the described illustrations, the target node comprises the one or more machine nodes 2a, 2b, 2c receiving and processing a request from a calling node to perform work with respect to one multi-node. The target node is further an agent node of the multi-node indicated in the agent list 54 of the multi-node information 50 (FIG. 2). Any node 2a, 2b, 2c may function as the calling node or target node. With respect to FIG. 3, control begins when the backup client, e.g., 10a, 10b, 10c, at the client node transmits (at block 100) a request to at least one target node to perform operations on behalf of one multi-node, where the target node is an agent node of the multi-node. This request may identify the multi-node on whose behalf the request for work is made. For instance, a user at the calling node may use a Web browser interface to distribute the work load for a multi-node to different agent nodes identified in the agent list 54 of the multi-node 50 (FIG. 2) to perform the work job, which may comprise a backup, restore or other operation. As part of distributing the workload, the user at the calling node distributes the request sent at block 100 to one or more agent nodes to invoke the agents to perform the work. Upon the target node receiving (at block 102) the request from the calling node for the target node to perform operations on behalf of the multi-node, the target node queries (at block 104) the server 6 to determine whether the calling node is one of the agent nodes associated with the multi-node. The server 6 may answer this query by checking whether the calling node is indicated in the agent list 54. If (at block 106) the calling node is not one of the agent nodes associated with the multi-node, i.e., not on the agent list 54, then the request to perform work is denied (at block 108). Otherwise, if (at block 106) the calling node initiating the work request is an agent node on the agent list 54, then control proceeds to block 110 to authenticate the calling node with the backup server 12. In an alternative embodiment, the authentication of the calling node initiating the request may be performed before the query determining whether the calling node is an authorized agent for the multi-node.

If (at block 106) the calling node is an agent node associated with the multi-node for which the work request is generated, then the target node transmits (at block 110) a request to the calling node to authenticate with the server 6 to ensure that the calling node is not only an agent of the multi-node, but also that the second agent is authenticated to perform the requested work with respect to the backup server 12. In response to this request to authenticate with the backup server 12, the calling node presents (at block 112) a token, which may be encrypted with a password, to authenticate the calling node at the server to the target node. In an alternative embodiment, the token may comprise the unencrypted password. The target node then presents (at block 114) the token from the calling node to the backup server 12.

Upon receiving the server, e.g., backup sever 12, response, which may comprise a valid server token to access the server or an authentication denied message, the target node sends (at block 116) the server response, such as a server token, to the calling node in response to receiving the server token/response from the server 6. In response, the calling node sends (at block 118) the server token/response back to the target node. The target node in response to receiving the server token from the target node then sends (at block 120) the server token to the server 12 to authenticate. In this way, the calling node authenticates through a session initiated by the target node that is requested to perform the work. If (at block 122 in FIG. 4) the response from the backup server 12 to the server token sent at block 120 indicates an invalid authentication, then the request to the target node to perform work on behalf of the multi-node is denied (at block 124). Otherwise, if the response from the server to the server token indicates that the calling node may authenticate, then the target node performs (at block 126) the operations requested by the calling node.

With the described embodiments, the calling node must both be an agent of the multi-node on whose behalf the work is requested and be able to authenticate with the server 6 before the target node, also an agent, performs the requested work. Further, because the target node passes tokens back to the calling node, if the backup server 12 issues a new token during the session, then the new token will be returned to the calling node to use during subsequent authentication requests.

In one embodiment, the work request may comprise a request to backup or restore data sets associated with a multi-node, such as the backup data sets 56 (FIG. 2). Alternatively, the work requested by the calling node, or calling agent node, may comprise work or jobs unrelated to backup and restore operations. Further, the calling node may select multiple target nodes that are agents of the multi-node to distribute and balance the workload for the multi-node.

In another embodiment, the target node comprises one of a plurality of target agent nodes. The calling node sends the request to perform work on behalf of the multi-node to multiple target nodes. In such case, the operations described as performed by the target node are performed by all of the target nodes receiving the request, including: determining whether the calling node is one of the agent nodes associated with the multi-node; determining whether the calling node is capable of authenticating with a server; and performing the requested operations if the calling node is associated with the multi-node and is capable of authenticating with the server. In this way, the verification of the calling agent node is performed by every target node to ensure that the calling node is an authorized agent of the multi-node and is capable of authenticating with the server.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In one embodiment, the node authentication operations were performed by backup client 10a, 10b, 10c and backup server 12 programs. In alternative embodiments, the authentication and verification operations may be performed by programs unrelated to backup and restore operation for different types of work that may be performed on behalf of the multi-node.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
associating a plurality of agent nodes in the network with a multi-node, wherein the agent nodes are associated with machines in the network capable of performing operations on behalf of the multi-node, and wherein the multi-node comprises a node that is defined as having computational resources comprising the associated agent nodes that perform operations on behalf of the multi-node;
receiving, by a target node, a request from a calling node for the target node to perform operations on behalf of the multi-node, wherein the target node is one of the agent nodes associated with the multi-node;
determining, by the target node, whether the calling node is one of the agent nodes associated with the multi-node;
determining, by the target node, whether the calling node is capable of authenticating with a server; and
performing, by the target node, the operations requested by the calling node in response to determining that the calling node is associated with the multi-node and is capable of authenticating with the server.

2. The method of claim 1, further comprising:
transmitting, by the target node, a request to the calling node to authenticate with the sewer in response to determining that the calling node is one agent node associated with the multi-node.

3. The method of claim 2, further comprising:
presenting, by the calling node, a token to authenticate the calling node at the server in response to the request from the target node to authenticate.

4. The method of claim 3, wherein presenting, by the calling node, the token to authenticate comprises passing the token to the target node, further comprising:
presenting, by the target node, the token from the calling node to the server; and
receiving, by the target node a server token from the server, wherein the calling node authenticates with the server if the server token is valid.

5. The method of claim 4, further comprising:
sending, by the target node, the server token to the server to request the server to indicate whether the server token is valid; and
receiving, by target node a response from the server indicating whether the server token is valid.

6. The method of claim 4, further comprising:
sending, by the target node, the server token to the calling node in response to receiving the server token from the server; and
sending, by the calling node, the server token to the target node, wherein the target node sends the server token to the server in response to receiving the server token from the calling node.

7. The method of claim 3, further comprising:
receiving, by the calling node, a new token from the server in response to presenting the token to authenticate with the server, wherein the calling node uses the new token to subsequently authenticate with the server.

8. The method of claim 1, wherein the calling node authenticates with the server through a session initiated with the target node.

9. The method of claim 1, wherein determining, by the target node, whether the calling node is one of the agent nodes associated with the multi-node comprises querying the server to determine from the server whether the calling node is one of the agent nodes associated with the multi-node.

10. The method of claim 1, wherein the multi-node is a member of a set of nodes comprising a virtual node and a machine node having attached storage.

11. The method of claim 1, wherein the operations requested by the calling node comprise operations to backup or restore data sets associated with the multi-node.

12. The method of claim 1, wherein the target node comprises one of a plurality of target nodes comprising agent nodes of the multi-node, further comprising:
   sending, by the calling node to the target nodes requests to perform operations on behalf of the multi-node, including the operations of determining whether the calling node is one of the agent nodes associated with the multi-node, determining whether the calling node is capable of authenticating with a server, and the operations requested by the calling node in response to determining that the calling node is associated with the multi-node and is capable of authenticating with the server.

13. The method of claim 12, wherein the calling node sends the requests to the target nodes to distribute the workload of the multi-node operations to the target nodes associated with the multi-node.

14. The method of claim 1, wherein a user is logged on at the calling node, further comprising:
   submitting to the target node, by the user of the calling node, the request for the target node to perform operations on behalf of the multi-node.

15. A system including machines communicating over a network, comprising:
   a server including information associating a plurality of agent nodes in the network with a multi-node, wherein the agent nodes are associated with machines in the network capable of performing operations on behalf of the multi-node;
   a calling node implemented on one machine in the network;
   a target node implemented on one machine in the network, wherein the target node includes a computer readable medium having code capable of causing the target node machine to perform operations, the operations comprising:
      receiving a request from the calling node for the target node to perform operations on behalf of the multi-node, wherein the target node is one of the agent nodes associated with the multi-node, and wherein the multi-node comprises a node that is defined as having computational resources comprising the associated agent nodes that perform operations on behalf of the multi-node;
      determining whether the calling node is one of the agent nodes associated with the multi-node;
      determining whether the calling node is capable of authenticating with the server; and
      performing the operations requested by the calling node in response to determining that the calling node is associated with the multi-node and is capable of authenticating with the server.

16. The system of claim 15, wherein the operations performed by the target node further comprise:
   transmitting a request to the calling node to authenticate with the server in response to determining that the calling node is one agent node associated with the multi-node.

17. The system of claim 16, wherein the calling node includes a computer readable medium having code capable of causing the calling node to perform operations comprising:
   presenting a token to authenticate the calling node at the server in response to the request from the target node to authenticate.

18. The system of claim 17, wherein presenting, by the calling node, the token to authenticate comprises passing the token to the target node and wherein the operations performed by the target node further comprise:
   presenting the token from the calling node to the server; and
   receiving a server token from the server, wherein the calling node authenticates with the server if the server token is valid.

19. The system of claim 18, wherein the operations performed by the target node further comprise:
   sending the server token to the server to request the server to indicate whether the server token is valid; and
   receiving a response from the server indicating whether the server token is valid.

20. The system of claim 18,
   wherein the operations performed by the target node further comprise: sending the server token to the calling node in response to receiving the server token from the server; and
   wherein the operations performed by the calling node further comprise: sending the server token to the target node, wherein the target node sends the server token to the server in response to receiving the server token from the calling node.

21. The system of claim 17, wherein the operations by the calling node further comprise:
   receiving a new token from the server in response to presenting the token to authenticate with the server, wherein the calling node uses the new token to subsequently authenticate with the server.

22. The system of claim 15, wherein the calling node authenticates with the server through a session initiated with the target node.

23. The system of claim 15, wherein determining, by the target node, whether the calling node is one of the agent nodes associated with the multi-node comprises querying the server to determine from the server whether the calling node is one of the agent nodes associated with the multi-node.

24. The system of claim 15, wherein the multi-node is a member of a set of nodes comprising a virtual node and a machine node having attached storage.

25. The system of claim 15, wherein the operations requested by the calling node comprise operations to backup or restore data sets associated with the multi-node.

26. The system of claim 15, wherein the target node comprises one of a plurality of target nodes comprising agent nodes of the multi-node, wherein the operations performed by the calling node further comprise:
   sending to the target nodes requests to perform operations on behalf of the multi-node, including the operations of determining whether the calling node is one of the agent nodes associated with the multi-node, determining whether the calling node is capable of authenticating with a server, and the operations requested by the calling node in response to determining that the calling node is associated with the multi-node and is capable of authenticating with the server.

27. The system of claim 26, wherein the calling node sends the requests to the target nodes to distribute the workload of the multi-node operations to the target nodes associated with the multi-node.

28. The system of claim 15, wherein a user is logged on at the calling node, wherein the calling node operations in response to user action further comprise:
submitting to the target node the request for the target node to perform operations on behalf of the multi-node.

29. An article of manufacture comprising distributed code executed in distributed nodes in a network, including a calling node and target node, and a server, wherein the nodes are implemented on machines communicating in the network, and wherein the distributed code is capable of causing the nodes and server to perform operations, the operations comprising:
associating, by the server, a plurality of agent nodes in the network with a multi-node, wherein the agent nodes are associated with machines in the network capable of performing operations on behalf of the multi-node, and wherein the multi-node comprises a node that is defined as having computational resources comprising the associated agent nodes that perform operations on behalf of the multi-node;
receiving, by the target node, a request from the calling node for the target node to perform operations on behalf of the multi-node, wherein the target node is one of the agent nodes associated with the multi-node;
determining, by the target node, whether the calling node is one of the agent nodes associated with the multi-node;
determining, by the target node, whether the calling node is capable of authenticating with a server; and
performing, by the target node, the operations requested by the calling node in response to determining that the calling node is associated with the multi-node and is capable of authenticating with the server.

30. The article of manufacture of claim 29, wherein the operations further comprise:
transmitting, by the target node, a request to the calling node to authenticate with the server in response to determining that the calling node is one agent node associated with the multi-node.

31. The article of manufacture of claim 30, wherein the operations further comprise:
presenting, by the calling node, a token to authenticate the calling node at the server in response to the request from the target node to authenticate.

32. The article of manufacture of claim 31, wherein presenting, by the calling node, the token to authenticate comprises passing the token to the target node, wherein the operations further comprise:
presenting, by the target node, the token from the calling node to the server; and
receiving, by the target node a server token from the server, wherein the calling node authenticates with the server if the server token is valid.

33. The article of manufacture of claim 32, wherein the operations further comprise:
sending, by the target node, the server token to the server to request the server to indicate whether the server token is valid; and
receiving, by target node a response from the server indicating whether the server token is valid.

34. The article of manufacture of claim 32, wherein the operations further comprise:
sending, by the target node, the server token to the calling node in response to receiving the server token from the server; and
sending, by the calling node, the server token to the target node, wherein the target node sends the server token to the server in response to receiving the server token from the calling node.

35. The article of manufacture of claim 31, wherein the operations further comprise:
receiving, by the calling node, a new token from the server in response to presenting the token to authenticate with the server, wherein the calling node uses the new token to subsequently authenticate with the server.

36. The article of manufacture of claim 29, wherein the calling node authenticates with the server through a session initiated with the target node.

37. The article of manufacture of claim 29, wherein determining, by the target node, whether the calling node is one of the agent nodes associated with the multi-node comprises querying the server to determine from the server whether the calling node is one of the agent nodes associated with the multi-node.

38. The article of manufacture of claim 29, wherein the multi-node is a member of a set of nodes comprising a virtual node and a machine node having attached storage.

39. The article of manufacture of claim 29, wherein the operations requested by the calling node comprise operations to backup or restore data sets associated with the multi-node.

40. The article of manufacture of claim 29, wherein the target node comprises one of a plurality of target nodes comprising agent nodes of the multi-node, wherein the operations further comprise:
sending, by the calling node to the target nodes requests to perform operations on behalf of the multi-node, including the operations of determining whether the calling node is one of the agent nodes associated with the multi-node, determining whether the calling node is capable of authenticating with a server, and the operations requested by the calling node in response to determining that the calling node is associated with the multi-node and is capable of authenticating with the server.

41. The article of manufacture of claim 40, wherein the calling node sends the requests to the target nodes to distribute the workload of the multi-node operations to the target nodes associated with the multi-node.

42. The article of manufacture of claim 29, wherein a user is logged on at the calling node, wherein the operations further comprise:
submitting to the target node, by the user of the calling node, the request for the target node to perform operations on behalf of the multi-node.

* * * * *